United States Patent
Crampon et al.

(10) Patent No.: US 10,246,360 B2
(45) Date of Patent: Apr. 2, 2019

(54) METHOD FOR THE CONTINUOUS THERMAL HYDROLYSIS OF SLUDGE WITH A HIGH DRYNESS VALUE

(71) Applicant: Veolia Water Solutions & Technologies Support, Saint-Maurice (FR)

(72) Inventors: Cedric Crampon, Champigny-sur-Marne (FR); Julien Chauzy, Antony (FR); Malik Djafer, Boulogne-Billancourt (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 248 days.

(21) Appl. No.: 15/107,606

(22) PCT Filed: Dec. 23, 2014

(86) PCT No.: PCT/EP2014/079255
§ 371 (c)(1),
(2) Date: Jun. 23, 2016

(87) PCT Pub. No.: WO2015/097254
PCT Pub. Date: Jul. 2, 2015

(65) Prior Publication Data
US 2016/0326038 A1   Nov. 10, 2016

(30) Foreign Application Priority Data

Dec. 26, 2013 (FR) .................................. 13 63607

(51) Int. Cl.
*C02F 1/02* (2006.01)
*C02F 1/34* (2006.01)
*C02F 11/18* (2006.01)

(52) U.S. Cl.
CPC .............. *C02F 11/18* (2013.01); *C02F 1/025* (2013.01); *C02F 1/34* (2013.01); *C02F 2301/06* (2013.01); *C02F 2303/06* (2013.01)

(58) Field of Classification Search
CPC .... C02F 1/02; C02F 1/025; C02F 1/34; C02F 11/06; C02F 11/08; C02F 11/086;
(Continued)

(56) References Cited

U.S. PATENT DOCUMENTS 3,687,646 A * 8/1972 Brent et al. ............... C01B 3/36
110/220
4,983,296 A * 1/1991 McMahon .............. C02F 11/10
210/603

(Continued)

OTHER PUBLICATIONS

Perry et al. Chemical Engineers Handbook Vo. 1, 7th ed., (1997), 18-21 through 18-73.*

*Primary Examiner* — Lucas A Stelling
(74) *Attorney, Agent, or Firm* — Coats & Bennett, PLLC

(57) ABSTRACT

Method and plant to implement the continuous thermal hydrolysis of sludge to be treated containing organic matter, the method comprising at least:
a. a step for de-structuring said sludge to be treated producing de-structured sludge;
b. a step for the thermal hydrolysis of said de-structured sludge within a thermal hydrolysis reactor producing hydrolyzed sludge;
c. a step for cooling said hydrolyzed sludge;
said step for de-structuring consisting in:
  introducing said sludge to be treated into a dynamic mixer;
  heating said sludge coming from said dynamic mixer, this heating being obtained by the introduction, into a heat exchanger, on the one hand of said sludge coming from
(Continued)

said dynamic mixer and, on the other hand, of said hydrolyzed sludge, this introduction inducing said cooling.

10 Claims, 3 Drawing Sheets

(58) Field of Classification Search
CPC .. C02F 11/18; C02F 2301/06; C02F 2303/06; C02F 11/12
See application file for complete search history.

(56) References Cited

U.S. PATENT DOCUMENTS

| | | |
|---|---|---|
| 6,913,700 B2 | 7/2005 | Solheim |
| 2004/0168990 A1* | 9/2004 | Solheim .................. C02F 1/025 210/774 |
| 2011/0114570 A1* | 5/2011 | Hojsgaard ............... C02F 11/18 210/752 |

* cited by examiner

METHOD FOR THE CONTINUOUS THERMAL HYDROLYSIS OF SLUDGE WITH A HIGH DRYNESS VALUE

This application is a U.S. National Stage Application of PCT Application No. PCT/EP2014/079255, with an international filing date of 23 Dec. 2014. Applicant claims priority based on French Patent Application No. 1363607 filed 26 Dec. 2013. The subject matter of these applications is incorporated herein.

1. FIELD OF THE INVENTION

The field of the invention is that of the treatment of sludge containing organic matter such as sludge from cleansing stations. More specifically, the method relates to a method for the continuous thermal hydrolysis of sludge containing organic matter, mixed or not mixed with other wastes containing organic matter. This sludge or these wastes can come for example from the treatment of domestic wastewater (for example digested or non-digested sludge coming from cleansing stations, fats from pre-treatment processes, etc.) or it can come from the treatment of industrial wastewater (for example wastewater coming from the agro-food industry, effluent from slaughterhouses, molasses, etc.), or it can be constituted by discharged matter from grease tanks. The term "sludge" shall be used hereafter to designate this sludge and/or these wastes.

2. PRIOR ART

Sludge coming from the treatment of wastewater, whether domestic or industrial, can be treated biologically, especially by anaerobic digestion.

The goal of biological treatment is to degrade the organic matter contained in this sludge in order to stabilize it, reduce its final volume and recover energy through the production of biogas. However, certain organic compounds are poorly degradable by biological means. To stretch the limits of sludge degradation, methods of thermal hydrolysis can be resorted to. This thermal treatment is generally done under pressure at a temperature of over 100° C. and, in practice, at temperatures that can go up to 220° C. for a predetermined period of time, in practice generally half an hour. Through such thermal hydrolysis treatment, a part of the organic matter which, initially, is poorly biodegradable is converted into compounds more easily degradable biologically.

Classically, this subsequent biological degradation is done by digestion within an anerobic reactor called a digester. Such anerobic digesters can work well only if they operate at a suitable and constant temperature, generally requiring a heating system, and only if they are properly stirred. This stirring is all the easier to carry out as the sludge entering the digester is fluid, i.e. has low viscosity.

In the prior art, various types of methods of thermal hydrolysis are known. Some of these methods are implemented by the treatment, one by one, i.e. discontinuously, of given quantities of sludge to be hydrolyzed (this is known as a batch operation). Other methods are designed to enable continuous treatment or at least semi-continuous treatment of sludge to be hydrolyzed.

In the prior art relating to these devices and methods of thermal hydrolysis, we can refer especially to the patent documents WO96/09882 and WO2006/027062 which both relate to batch methods.

Such batch methods have the drawbacks of requiring the management of cycles for treating different batches of sludge that have to be treated and a repetitive operation of certain apparatuses such as the opening/closing of valves for example, which can lead to premature wear and tear. This mode of operation also requires the management of cycles of live steam and flash steam. Above all, this mode of operation has low potential for energy recovery.

The techniques for treating sludge continuously or semi-continuously by thermal hydrolysis include those described in the patent document EP1198424 and in the patent document WO2009/121873.

These techniques implement hydrolyzed concentrated water-sludge exchanges for the cooling of hydrolyzed sludge before injection into the digester. In practice, the management of the exchangers proves to be difficult and entails constraints for the user since they require periods of stoppage for maintenance and cleaning. In addition, this configuration is limited in terms of concentration of sludge to be treated inasmuch as they cannot be used to treatment sludge having a dry content of over 10%. In addition, they are not optimized in terms of energy consumption because if the sludge were to be even more concentrated (i.e. if it had a dry content of over than 20% and therefore a water content below 80%), then the need for steam would be further reduced since the volume of water (contained in the sludge) to be heated with the steam would be reduced. The term "dry content" (or "dry-solids content") of the sludge is understood to refer to the percentage by weight of dry matter that it contains. Indeed, sludge is a fluid formed by a mixture of organic matter, mineral matter and water. The dryness content of the sludge is calculated by establishing the ratio between the weight of the dry matter and the total weight of the sludge.

In the technique described in the patent document WO2009/121873, the sludge is treated continuously in a thermal hydrolysis reactor taking a tubular shape into which steam is directly injected.

This method has the advantage of being truly continuous. However, although it has considerably improved the treatment of sludge by thermal hydrolysis as compared with other methods existing in the market, it nevertheless has certain drawbacks.

Indeed, if the dry content of the sludge to be hydrolyzed introduced into the reactor is too high, then it can prove to be difficult to inject steam into this sludge. Beyond certain levels of dry content, the thermal hydrolysis can be incomplete, limiting the performance of the anerobic digestion planned downstream to this hydrolysis.

The methods of thermal hydrolysis on sludge having high dry content therefore come up against the difficulty of efficiently carrying out the injection of steam into this sludge as well as the mixing of this sludge with the injected steam.

The methods of continuous thermal hydrolysis do not make it possible, at present, to optimize their energy consumption because conventional heat exchangers are not designed to treat pasty fluids such as sludge. Thus, in practice, it is not possible to envisage the use of such exchangers to recover heat from hydrolyzed sludge.

However, there are known heat exchangers called "scraped surface" heat exchangers which are provided with a scraper shaft used to push the sludge into the exchanger or devices that use an additional mechanical means.

However, while these exchangers can theoretically work with sludge having a dry content of over 10%, they are in practice limited to dry content values of 8% to 10%. This can be explained by the very nature of the sludge: the sludge is formed by organic matter, mineral matter and water. The pasty, viscous and non-homogenous nature of the sludge disturbs its flow. Another considerable drawback of scraped surface exchangers is that they require an intermediate fluid, generally water, to heat the incoming sludge or cool the outgoing sludge. More precisely, water, heated by hydrolyzed sludge at the exit from the thermal hydrolysis process, will transmit a part of the heat to the sludge to be treated at the entry to the hydrolysis process. Beyond the maximum dry content limit of 10%, the pressure losses observed, of the order of a few bars depending on the dry content of the sludge to be treated, and the difficulties of operation of the exchanger, make the method economically unpromising.

Another drawback is that these exchangers are also limited in capacity: it is therefore necessary to place several exchangers in series in order to treat a sufficient volume. As a consequence, the energy consumption of motors that drive the exchangers gets added up and this entails penalties in terms of energy consumption.

Another disadvantage of these scraping shaft exchangers or exchangers using additional mechanical means is related to their maintenance. The fouling related to the circulation of pasty sludge requires regular maintenance, which is difficult to implement. This regular maintenance implies the complete stoppage of the process, or an increase in the number of exchangers to enable the maintenance of certain exchangers while others continue to be in operation.

3. GOALS OF INVENTION

The invention is aimed especially at overcoming these drawbacks of the prior art.

More specifically, it is a goal of the invention, in at least one embodiment, to provide a method of thermal hydrolysis of sludge enabling the treatment of sludge having a dry content of over 10%.

It is another goal of the invention, in at least one embodiment, to implement such a method for achieving energy savings as compared with conventional methods.

It is yet another goal of the invention to propose a method for treating sludge making it possible, in at least one embodiment, to carry out a pre-heating of the sludge while at the same time limiting pressure losses.

The invention is also aimed at proposing a method of this kind that makes it possible, in at least one embodiment, to facilitate the maintenance of the equipment implemented.

4. SUMMARY OF THE INVENTION

1. These goals, as well as others that shall appear here below, are attained by means of a method for the continuous thermal hydrolysis of sludge to be treated containing organic matter, the method comprising at least:
   a. a step for de-structuring said sludge to be treated producing de-structured sludge;
   b. a step of thermal hydrolysis of said de-structured sludge within a thermal hydrolysis reactor producing hydrolyzed sludge;
   c. a step for cooling said hydrolyzed sludge;
   said step for de-structuring consisting in:
   introducing said sludge to be treated into a dynamic mixer;
   heating said sludge coming from said dynamic mixer, this heating being obtained by the introduction, into a heat exchanger, on the one hand of said sludge coming from said dynamic mixer and, on the other hand, of said hydrolyzed sludge, this step of introduction inducing said cooling of said hydrolyzed sludge.

Thus, the invention increases the fluidity of the sludge to be treated upstream to the method of thermal hydrolysis in subjecting this sludge to a high speed gradient in a dynamic mixer and secondly by heating this sludge to be treated in recovering the heat from the sludge treated by thermal hydrolysis without using any intermediate fluid. The inventors have indeed noted that subjecting the sludge to a high shear strain breaks the structure of the sludge and lowers its viscosity and hence fluidizes it. The combination of mechanical de-structuring and positive action on the viscosity of the sludge by heat enables the further fluidizing of the sludge to be treated.

Once the sludge has been fluidized by the application of a high gradient of speed in the dynamic mixer, they are heated by passing into a heat exchanger. According to the invention, this heat exchanger does not work with an intermediate fluid such as those described in the prior art: this heat exchanger heats the de-structured sludge to be treated by directly recovering the heat from the hydrolyzed sludge. In other words, a sludge/sludge heat exchanger such as the one proposed by the invention is a heat exchanger in which the sludge to be heated directly recovers the heat from the outgoing sludge which is at high temperature without using any intermediate heat-carrying fluid. This characteristic has numerous advantages, for example:
- the heat contributes to maintaining the low viscosity of the de-structured sludge,
- the recovery of the heat of the hydrolyzed sludge, without using any intermediate fluid, enables substantial energy savings, and especially halves energy consumption;
- the fluidized sludge circulates more easily in the heat exchanger where it continues to rise in temperature, further reducing its viscosity: the pressure losses are therefore greatly limited as compared with the existing techniques, and the fouling of the exchanger is limited.

More precisely, the heat reduces viscosity of the sludge and keeps the sludge in a state of low viscosity, thus on the one hand considerably reducing the pressure losses in the heat exchanger and, on the other hand, limiting the fouling of the exchanger.

It will be noted that the injection of steam alone is not enough to sufficiently fluidize the sludge and does not resolve the problems of flow of sludge in the heat exchangers.

The present invention therefore provides for a step for de-structuring the sludge combining the effects of speed on the structure of the sludge and possibly the effects of the heat. The application of a high shear rate on the sludge breaks the structure of the sludge, thus diminishing its viscosity. Subjecting the sludge to heating, even of a moderate level, further fluidizes the de-structured sludge. Thus, it is easier to make the sludge pass through a heat exchanger: the fluidized sludge flows more easily and the pressure losses are considerably reduced.

In addition, the sludge coming out of the hydrolyzed reactor is at a temperature greater than or equal to 160° C. Recovering its heat considerably reduces the energy consumption in the method. In particular, the hydrolyzed sludge yields its heat to the de-structured sludge to be treated thus enabling firstly the hydrolyzed sludge to be cooled before being conveyed into a step of subsequent treatment, and secondly the de-structured sludge to be heated at lower cost.

The method according to the invention can also comprise a preliminary step for pumping the sludge to be treated, to introduce it into the dynamic mixer.

In one embodiment of the invention, said sludge to be treated has a dry content of at least 20%, preferably at least 40%

In one particularly advantageous embodiment, said step of de-structuring furthermore comprises a step for injecting steam into said dynamic mixer.

The injection of steam into the dynamic mixer, i.e. during the step for de-structuring the sludge to be treated by shearing, significantly reduces the viscosity of the sludge.

Advantageously, said sludge to be treated is subjected, within said dynamic mixer, to a speed gradient of 1500 rpm to 4000 rpm. According to the invention, the dynamic mixer is situated upstream to the heat exchanger.

Preferably, said step of thermal hydrolysis is conducted at a temperature of 165° C. to 180° C. and at a pressure of 8 bars to 10 bars.

Advantageously, said steam injected into said dynamic mixer has a temperature of 120° C. to 190° C. and/or is at a pressure of 2 bars to 13 bars. Preferably, the sludge in said dynamic mixer has a temperature of 25° C. to 55° C., preferably 35° C. to 45° C. and, more preferably, a temperature of about 40° C. The inventors have observed that the injection of steam at 190° C. gives a temperature for the sludge of about 40° C. in said dynamic mixer. This enables the viscosity of the de-structured sludge to be reduced by about 60%.

In one particularly advantageous embodiment, the method according to the invention furthermore comprises a step for simultaneously carrying out the injection of steam under pressure into said sludge coming from said heat exchanger and the mixing of said sludge with said steam by means of a dynamic injector-mixer so as to obtain a uniform mixture of de-structured sludge heated to the desired temperature of thermal hydrolysis, said mixture being conveyed into said thermal hydrolysis reactor.

Preferably, said steam injected into said dynamic injector-mixer has a pressure of 1 bar to 23 bars, and/or a temperature of 13° C. to 220° C.

Advantageously said dynamic injector-mixer comprises a rotor, the rotation speed of said rotor during said de-structuring step ranging from 500 rpm to 2000 rpm. Preferably, the speed of the rotor is about 2000 rpm.

In one promising embodiment, said step for cooling is followed by a step for digesting said hydrolyzed and cooled sludge.

The originality of the invention also lies in the fact that the hydrolyzed sludge directly yields its heat to the mechanically de-structured sludge pre-heated in the sludge/sludge heat exchanger. In this way, the de-structured and pre-heated sludge is directly heated by the hydrolyzed sludge, thus playing a part in increasing its fluidity. The hydrolyzed sludge is concomitantly thus cooled and can be subjected to the digestion step.

According to the invention which allows the fluidizing of the sludge with high dry content, it is possible to use a heat exchanger that does not implement any intermediate fluid (water): the hydrolyzed sludge directly yield its heat to the de-structured sludge to be treated. Thus, considerable energy savings can be obtained.

Another object of the invention concerns a plant for implementing a method according to the invention comprising:

a. means for conveying sludge to be treated;
b. a dynamic mixer comprising an inlet for said sludge to be treated and an outlet of de-structured sludge;
c. a heat exchanger comprising a first inlet connected to said outlet of said de-structured sludge and an outlet of heated de-structured sludge;
d. a thermal hydrolysis reactor comprising an inlet connected to said outlet of heated de-structured sludge, an inlet of steam under pressure and an outlet of hydrolyzed sludge;
e. means for recirculating said hydrolyzed sludge, said means for recirculating being connected to a second inlet of said heat exchanger, said heat exchanger furthermore comprising an outlet of cooled hydrolyzed sludge.

Preferably, the plant according to the invention furthermore comprises means for injecting steam into said dynamic mixer. The injection of steam into the dynamic mixer diminishes the viscosity of the de-structured sludge in order to make them it into the exchanger. It also enables savings in the energy implemented to make the rotor operate.

In one particularly advantageous embodiment, the plant according to the invention furthermore comprises a dynamic injector-mixer, said dynamic injector-mixer comprising an inlet for the de-structured sludge coming from said heat exchanger, a steam inlet and an outlet for a homogenous mixture of heated de-structured sludge connected to the inlet of said thermal hydrolysis reactor.

It will be noted that in the present description, the term "dynamic injector-mixer" refers to any mixer constituted by a chamber and by means used to bring about a stirring, through motor-driven mechanical means, of the different phases entering this chamber in order to obtain a uniform mixture at exit. Such elements can for example be constituted by blades or screws moved by a rotor or any other mixing means also moved by a rotor. The dynamic injector-mixer enables the production of a mixture of homogenous de-structured sludge. The homogeneity of the mixture contributes to the efficiency of the thermal hydrolysis reaction. The steam injected into said dynamic injector-mixer can be either live steam or recycled steam. The recycled steam can especially come from the thermal hydrolysis step. Preferably, the injected steam is live steam.

Advantageously, the plant according to the invention further comprises a digester comprising an inlet connected to said outlet of cooled hydrolyzed sludge.

In one variant of the invention, said heat exchanger extends essentially vertically or horizontally. Preferably, said heat exchanger extends in an essentially vertical direction, making it possible to obtain greater homogeneity of flow of the sludge and therefore of the exchanges while at the same time reducing the footprint.

5. LIST OF FIGURES

Other features and advantages of the invention shall appear more clearly from the following description of a preferred embodiment, given by way of a simple illustratory and non-exhaustive example and from the appended drawings, of which:

6. DESCRIPTION OF ONE EMBODIMENT OF THE INVENTION

The general principle of the invention relies on the implementing of a step for the de-structuring of the sludge followed by a step for heating the sludge in a heat exchanger, upstream to a method of thermal hydrolysis. The step for de-structuring the sludge is done by subjecting the sludge to a high-speed gradient, enabling its structure to be broken, possibly accompanied by pre-heating through the injection of steam. The sludge thus de-structured and possibly heated can enter the heat exchanger where it will be heated through the recovery of heat from the hydrolyzed sludge. The heating of the de-structured sludge, whether pre-heated or not, reduces its viscosity thus enabling the sludge to be made to circulate in the heat exchanger while considerably reducing or even totally eliminating the pressure losses within the exchanger. The sludge thus de-structured flows more easily within the heat exchangers, and the pressure losses are considerably reduced. In addition, the exchangers are less fouled, and this facilitates their maintenance.

6.1 Example of an Embodiment of a Plant for Implementing the Method According to the Invention.

Figure 1:
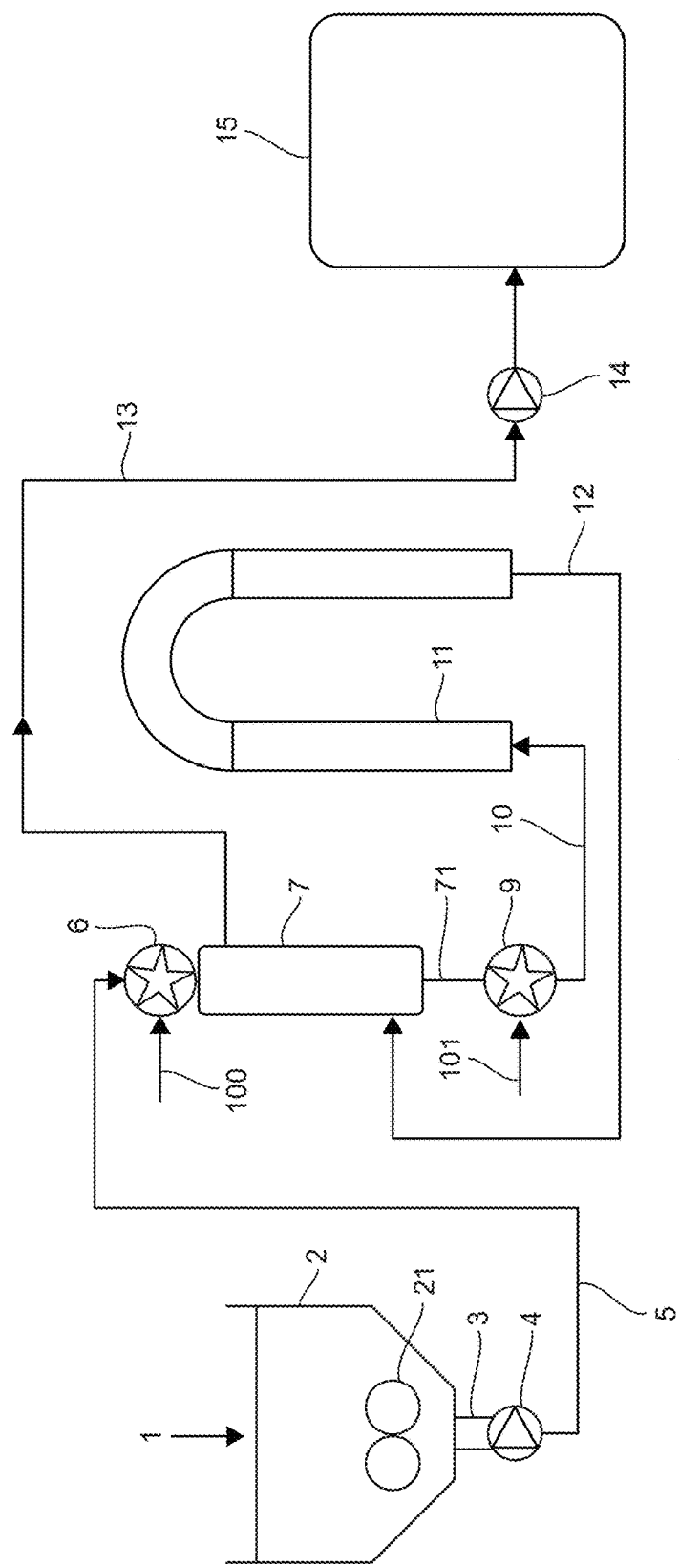
FIG. 1 is a block diagram of one embodiment of a plant for implementing the method according to the invention.

Referring now to FIG. 1, we present an embodiment of a plant for implementing the method according to the invention.

In this embodiment, the dehydrated sludge to be treated 1 is poured into a hopper 2 comprising mixing means 21 such as a worm screw used to prevent cavitation in the feed pump 4 installed at the exit 3 of the hopper. However, the speed applied to the dehydrated sludge is not sufficient to de-structure it and reduce its viscosity. The dehydrated sludge is at ambient temperature, i.e. about 20° C.

The pump 4 sends the dehydrated sludge through the pipe 5 into a dynamic mixer 6. The dynamic mixer 6 comprises a rotor which, in this embodiment, rotates at 2000 rpm. It is important that the speed of the rotor should be at least one 1500 rpm, preferably 1500 to 4000 rpm. Such a speed can de-structure the sludge by eliminating the internal strains existing within the sludge and therefore can fluidize the sludge.

Optionally, live steam 100 at a temperature of 190° C. is injected into the dynamic mixer 6. The injector of steam into the dynamic mixer 6 pre-heats the sludge to a temperature of about 40° C. This pre-heating step also reduces the viscosity of the dehydrated and de-structured sludge.

The de-structured* and pre-heated sludge then travels through a sludge/sludge heat exchanger 7. In the exchanger 7, the pre-heated and mechanically de-structured sludge in the dynamic mixer flows in a counter-flow to the hydrolyzed sludge. Thus, the de-structured sludge is heated by the hydrolyzed sludge which, for its part, is cooled in return. This heat exchanger 7 comprises a first entry linked to the exit of the dynamic mixer 6 and a first exit used to discharge the heated de-structured sludge via a pipe 7 connected to a dynamic injector-mixer 9. At exit from the exchanger 7, the sludge has a temperature of 90° C. to 110° C.

Steam 101 is injected into the dynamic injector-mixer 9. The injector-mixer 9 enables the sludge to be heated again in order to raise its temperature to about 160° C., the temperature required for thermal hydrolysis. The sludge thus taken to a higher temperature is sent via a pipe 10 to a thermal hydrolysis reactor 11. As shown in FIG. 1, the reactor 11 has a rising part, an elbow and a descending part.

Within the reactor 11, the sludge is hydrolyzed to a temperature of about 160° C. and a pressure of 8 to 10 bars. The reactor 11 comprises an exit connected by a pipe 12 to a second entry of the heat exchanger 7. This pipe 12 conveys the hydrolyzed sludge to the exchanger 7 in which it yields its heat to the de-structured sludge, thus enabling this sludge itself to be cooled. The hydrolyzed sludge thus cooled is discharged by a second exit from the exchanger 7 to a subsequent processing step. In particular, the cooled hydrolyzed sludge is sent via the pipe 13 to a digester 15. The pipe can also comprise a pump 14 used to regulate the flow-rate of circulation of the hydrolyzed sludge and therefore to regulate, inter alia, the pressure within the reactor 11.

The implementing of the sludge/sludge exchanger 7 optimizes the recovery of energy between the hydrolyzed sludge coming out of the thermal hydrolysis reactor and the sludge to be treated entering this same reactor, and does so without any use of intermediate fluid. The method according to the invention saves a great deal of energy by recycling the heat of the thermal hydrolysis reaction, i.e. by re-injecting, upstream to the hydrolysis process, a part of the heat recovered downstream from this same thermal hydrolysis reaction. The de-structuring step comprises the mechanical de-structuring of the sludge by subjecting it to a high-speed gradient in the dynamic mixer, thus reducing viscosity. At the same time, the step for pre-heating the de-structured sludge within the dynamic mixer itself further reduces the viscosity of the sludge before heating the sludge in the heat exchanger. Thus, we obtain sludge that is considerably fluidized as compared with the prior-art techniques: the flow of sludge in the apparatuses is thereby greatly facilitated and the pressure losses are correspondingly reduced, especially in the heat exchanger.

6.2 Comparative Trials

Comparative trials were conducted on sludge coming from the cleansing station. This sludge contains a substantial quantity of organic matter and has a dry content of about 27%.

Figure 2:
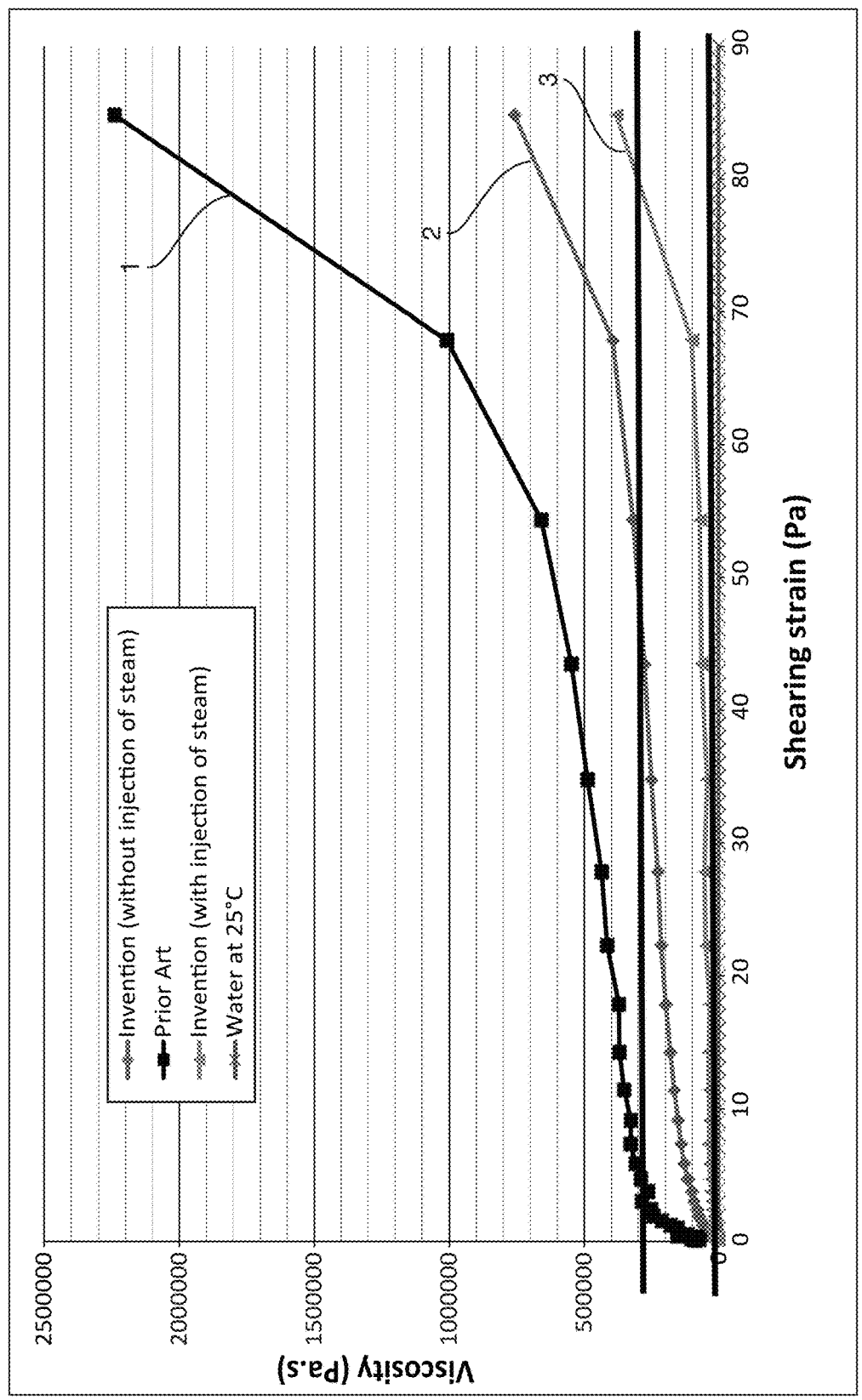
FIG. 2 is a graph presenting the results of comparative tests on the viscosity of the sludge treated either by the conventional method or by the method according to the invention with and without injection of steam during the de-structuring step.

The sludge was separated three into batches, each treated by one of the following methods:
- a conventional method (FIG. 2 curve 1) without injection of steam or any mechanical de-structuring step;
- or the method according to the invention as described in paragraph 6.1 without injection of steam into the dynamic mixer 6, (FIG. 2 curve 2); or again
- the method according to the invention as described in paragraph 6.1 with injection of steam at 190° C. into the dynamic mixer 6 to carry the temperature of the sludge to be treated to 40° C. (FIG. 2 curve 3).

Initially, the viscosity of the sludge at entry to the hydrolysis reactor 11 was measured. As can be seen, the sludge behaves like a thixotropic rheo-thickening fluid, i.e. the viscosity increases with the shear strains. However, whatever the strain applied, it can be seen in this graph that the reduction of viscosity always occurs in the same proportions. However, the curves 2 and 3 of FIG. 2 compliant with the invention indicate viscosity below that of the sludge treated by the classic prior-art method (curve 1). The step of de-structuring therefore considerably reduces the internal strains existing in the sludge. The step of injection of steam at 190° C. to heat the sludge to 40° C. improves its viscosity of the sludge but is not enough on its own to resolve the problem of viscosity observed. The step of de-structuring considerably reduces the viscosity of the sludge.

Figure 3:
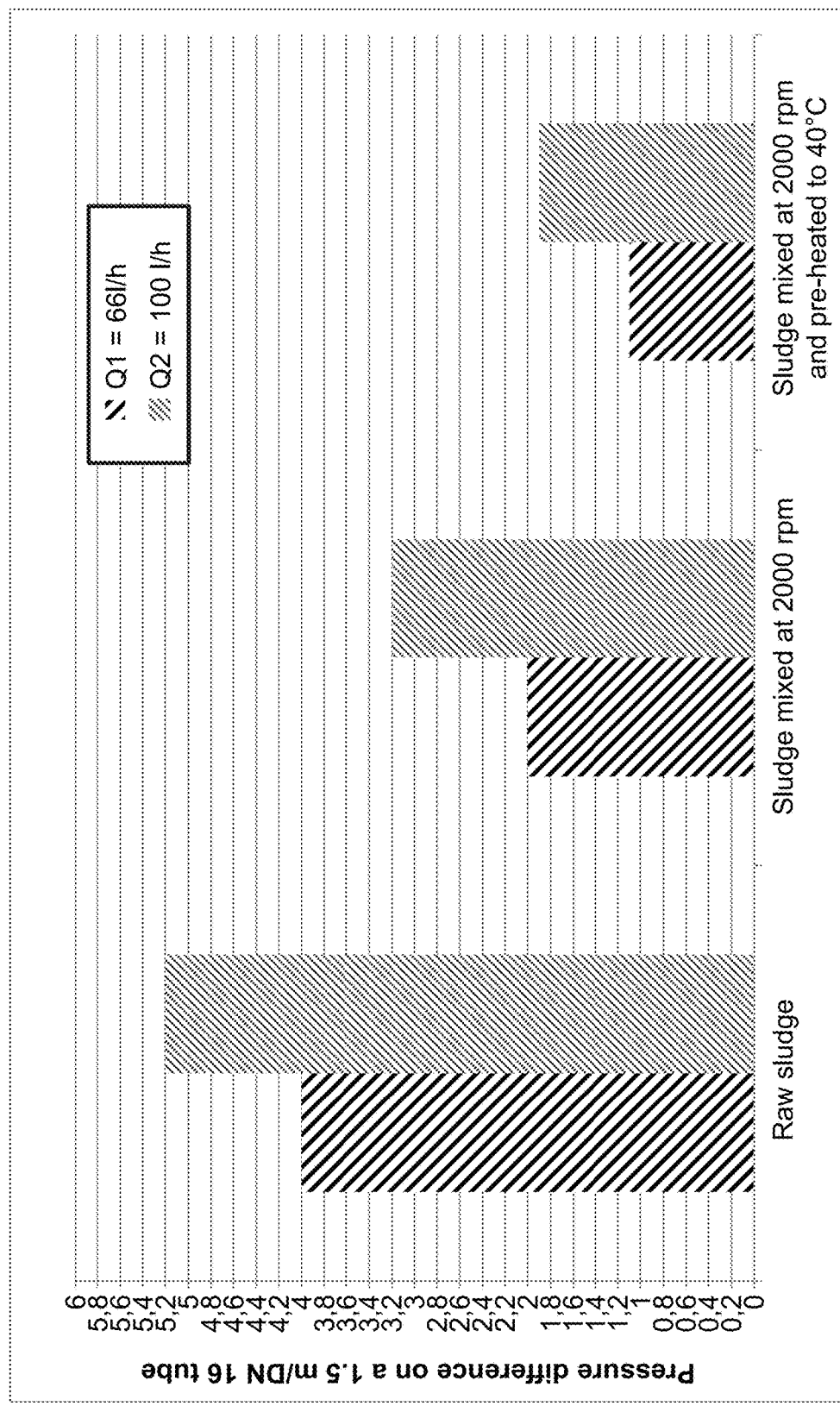
FIG. 3 is a graph presenting the variations of the pressure loss measured in a 1.5 m/DN16 tube during the comparative tests of FIG. 2, as a function of the flow-rate.

The variations in the pressure losses in a 1.5 m tube with a nominal diameter (DN) of 16 mm were evaluated on three batches of sludge treated according to the conditions of FIG. 3 (raw sludge, sludge mixed at 2000 rpm and sludge mixed at 2000 rpm and heated to 40° C.). The flow-rate of circulation of the sludge in the tube was modified in order to evaluate the impact of this parameter on the pressure losses. The sludge was therefore circulated either at a flow-rate Q1 of 66 L/h or at a flow-rate Q2 of 100 L/h. As can be seen in FIG. 3, the higher the flow-rate, the greater the increase in the pressure loss. Another major point is that the method of the invention reduces the pressure losses by a factor 2 as compared with the conventional method. The injection of steam into the dynamic mixer reduces the pressure losses by a factor 4 as compared with the conventional method. As a consequence, the method of the invention considerably reduces the viscosity and the pressure losses through the exchanger.

The invention claimed is:

1. A method for the continuous thermal hydrolysis of sludge to be treated containing organic matter, the method comprising at least:
   a. a step for de-structuring said sludge to be treated producing de-structured sludge, said sludge having a dry solids content greater than 20% (wt.);
   b. a step for the thermal hydrolysis of said de-structured sludge within a thermal hydrolysis reactor producing hydrolyzed sludge;
   c. a step for cooling said hydrolyzed sludge;
   said step for de-structuring including:
      introducing said sludge to be treated into a dynamic mixer comprising a chamber and a rotor
      injecting steam into the dynamic mixer;
      rotating the rotor at a speed gradient between 1500 rpm and 4000 rpm to mix and de-structure the sludge;
      heating said sludge coming from said dynamic mixer, this heating being obtained by the introduction, into a heat exchanger, on the one hand of said sludge coming from said dynamic mixer and, on the other hand, of said hydrolyzed sludge, this introduction inducing said cooling.

2. The method of claim 1, characterized in that said steam injected into said dynamic mixer has a temperature of 120° C. to 190° C. and/or a pressure of 2 bar to 13 bar.

3. The method of claim 1, characterized in that the method comprises a step for carrying out, simultaneously, the injection of steam under pressure into said sludge coming from said heat exchanger and the mixing of said sludge with said steam by means of a dynamic injector-mixer so as to obtain a uniform mixture of sludges de-structured and heated to the desired temperature of thermal hydrolysis, said mixture being conveyed into said thermal hydrolysis reactor.

4. The method of claim 3, characterized in that said steam injected into said dynamic injector-mixer has a pressure of 1 bar to 23 bars, and/or a temperature of 100° C. to 220° C.

5. The method of claim 1, characterized in that said step for cooling is followed by a step for digesting said hydrolyzed and cooled sludges.

6. A plant for continuously thermally hydrolyzing sludge comprising:
   a. means for conveying sludge to be treated;
   b. a dynamic mixer having a rotor configured to rotate 1500-4000 rpm;
   c. said dynamic mixer configured to receive the sludge and to de-structure the sludge and produce a homogeneous de-structured sludge;
   d. a heat exchanger located downstream from the dynamic mixer and comprising an inlet configured to receive said homogeneous de-structured sludge from the dynamic mixer and an outlet for discharging heated homogeneous de-structured sludge;
   e. a thermal hydrolysis reactor located downstream of said heat exchanger and including an inlet for receiving the heated homogeneous de-structured sludge produced by the heat exchanger;
   f. means for recirculating said hydrolyzed sludge to a hydrolyzed sludge inlet associated with the heat exchanger such that the heat exchanger is a sludge-to-sludge heat exchanger that effectively cools the thermally hydrolyzed sludge; and
   g. a dynamic injector-mixer located downstream of said heat exchanger, and wherein said dynamic injector-mixer is configured to receive the homogeneous de-structured sludge produced by said heat exchanger; and wherein said dynamic injector-mixer further comprises a steam inlet for receiving steam and an outlet for discharging a homogenous mixture of heated de-structured sludge.

7. The plant according to claim 6, characterized in that said plant comprises means for injecting steam into said dynamic mixer.

8. The plant of claim 6 further comprising a digester located downstream of the thermal hydrolysis reactor for receiving and digesting thermally hydrolyzed sludge.

9. The plant of claim 6 wherein said heat exchanger extends essentially vertically or horizontally.

10. A method for continuous thermal hydrolysis of dehydrated sludge containing organic matter, the method comprising:
   a. subjecting the dehydrated sludge having a dry solids content exceeding 20% (wt.) to a sludge de-structuring process and mechanically de-structuring the sludge and reducing the viscosity of the sludge and in the process forming a fluidized homogeneous de-structured sludge;
   b. wherein mechanically de-structuring the sludge comprises:
      i. directing the sludge into a dynamic mixer comprising a chamber having a rotor;
      ii. injecting steam into the dynamic mixer and driving the rotor at a speed of 1500-4000 rpm;
   c. directing the homogenized de-structured sludge from the dynamic mixer into and through a sludge-to-sludge heat exchanger and heating the homogenized de-structured sludge;
   d. directing the heated homogenized de-structured sludge from the heat exchanger to a thermal hydrolysis reactor and thermally hydrolyzing the sludge; and
   e. directing the thermally hydrolyzed sludge back to and through the sludge-to-sludge heat exchanger where the thermally hydrolyzed sludge heats the homogenized de-structured sludge produced by the dynamic mixer.

* * * * *